(No Model.)

W. WHEELER.
GUIDE FOR RULING OR FOR AIDING IN CUTTING GLASS.

No. 264,499. Patented Sept. 19, 1882.

Witnesses.
S. N. Piper.
L. M. Miller.

Inventor:
William Wheeler.
by R. H. Eddy, att'y.

UNITED STATES PATENT OFFICE.

WILLIAM WHEELER, OF CONCORD, MASSACHUSETTS.

GUIDE FOR RULING OR FOR AIDING IN CUTTING GLASS.

SPECIFICATION forming part of Letters Patent No. 264,499, dated September 19, 1882.

Application filed February 13, 1882. (No model.)

*To all whom it may concern:*

Be it known that I, WILLIAM WHEELER, of Concord, in the county of Middlesex and State of Massachusetts, have invented a new and useful improvement in guides for ruling or for aiding in cutting glass plates for separating them into sections for use in the manufacture of parabolic or various other reflectors; and I do hereby declare the same to be described in the following specification and represented in the accompanying drawings, of which—

Figure 1:
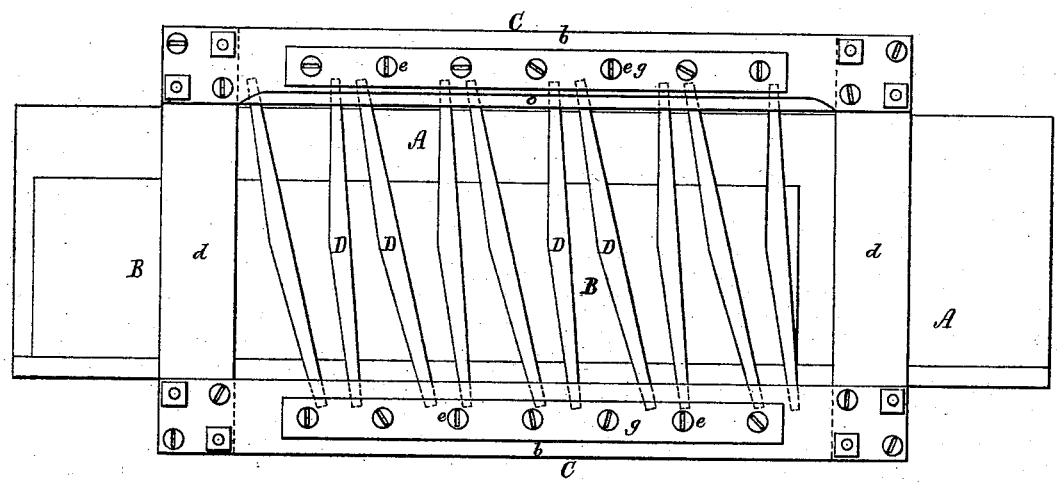
Figure 2:
Figure 3:
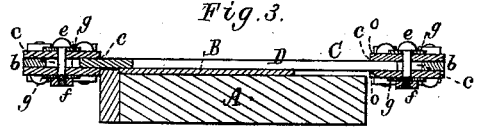
Figure 4:
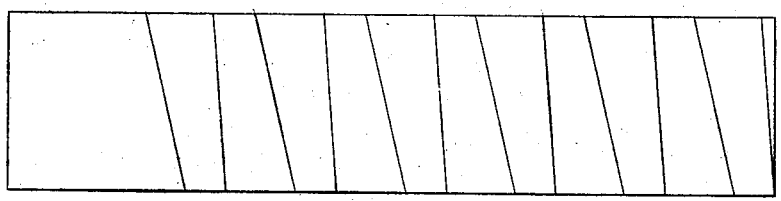

Figure 1 is a top view, Fig. 2 a longitudinal section, and Fig. 3 a transverse section, of a ruling-guide and its tablet in accordance with my invention. Fig. 4 is a representation of a plate of glass and the lines or cuts therein for effecting its reduction into sections, such being trapezoidal in shape.

The nature of my invention is duly set forth in the claims hereinafter presented.

In the drawings, A denotes a tablet or rectangular plate or board for supporting the plate or strip of glass to be reduced, such being arranged therein, as shown at B.

C is a rectangular frame, each of whose two longitudinal or parallel bars, *b*, is deeply grooved or slotted from its inner edge inward, as shown at *c*. These bars I usually make somewhat thicker than their connecting or transverse bars *d*, in order that the said longitudinal bars may project somewhat beyond the transverse bars at their opposite flat surfaces, such being to enable the tablet to extend up within the frame C a short distance, and such frame to be supported against the edge of the tablet.

Extending across the frame C, and into its grooves or slots *c c*, is a series of rulers, D, each generally being shaped as represented, although it may be otherwise formed.

The frame C is provided with means of clamping the rulers in place in the grooves or slots, as shown, such means consisting of two series of screws, *e*, and nuts *f*, or such and strips *g*, of metal, all being arranged as represented. The screws go through the bars *b* and the strips *g* and into the nuts. After the rulers may have been adjusted in their several positions in the bars the nuts are to be screwed up, so as, with the screws, to contract such bars upon the rulers, and thereby secure them in such positions.

It will be observed that each ruler is represented as having one continuous straight edge, while the other edge is angular or crowned, such being for giving strength to the ruler to prevent it from springing while a glass-cutting tool or diamond is being borne along the straight or guide edge of such ruler; besides, this construction of the ruler renders it narrow near its ends, and thus admits of it being adjusted into angular positions with respect to a next adjacent ruler, that could not well be obtained were each of the rulers of like widths throughout, and sufficiently wide to prevent it from being bent or sprung by the cutting-tool while in use against such ruler.

The rulers, having been suitably arranged and fixed in the frame, are to be placed over the sheet of glass of the necessary width deposited on the tablet, after which a glass-cutting tool is to be drawn across the glass plate and against the straight guiding-edges of the several rulers. In this way the plate will be correctly reduced to sections, each of which will be tapering or trapezoidal in its shape.

For properly adjusting the rulers or bringing them into their inclined positions in the frame, I generally make use of a sheet of paper of the requisite width, having lines indicative of lines of cuts ruled on it, such sheet being laid on the tablet and under the rulers prior to their being so adjusted, the lines serving as guides to bring the rulers into place. Sometimes I arranged slots in the bars *b*, so as to have the clamping-screws go through such slots and the rulers when the latter are applied to the sides of the bars or in grooves or slots in the bars.

It will be seen that the upper side of the bars *b* is beveled on its inner edge, as represented at *o o*, such being to show that the other bar is that to be used against the tablet in cutting the glass plate with either of the series of opposite flat surfaces of the rulers in contact therewith. The frame as made and arranged with its rulers is susceptible of being used either side downward to enable it (the said frame) to be employed in cutting what are usually termed the "rights" as well as the "lefts" of the reflecting sections.

What I claim as my invention is as follows, viz:

1. The frame C, having its two opposite bars, b, slotted or grooved, in combination with a series of adjustable rulers, D, applied to the said bars, and also with means of clamping each of said rulers thereto when in its adjusted position therewith, all being essentially and for the purpose as specified.

2. The combination of the glass supporter or tablet A with the frame C, having its two opposite bars, b, grooved or slotted, as set forth, and with the series of adjustable rulers D and devices or means of clamping such ruler in the said grooves, all being substantially as explained.

3. The frame C, having its two opposits bars, b, grooved or channeled at their inner edges, in combination with a series of rulers, D, each wider at its middle than at its ends, and arranged in the said bars, and also with devices or means of clamping such rulers in place in the said bars, all being substantially and for use as set forth.

WILLIAM WHEELER.

Witnesses:
R. H. EDDY,
E. B. PRATT.